April 30, 1963    B. F. LATHAM, JR., ET AL    3,087,796
APPARATUS FOR MAKING CARBON BLACK
Filed May 31, 1960    3 Sheets-Sheet 1

INVENTORS
BURTON F. LATHAM JR.
THEODORE A. RUBLE
BY
ATTORNEY

April 30, 1963 B. F. LATHAM, JR., ET AL 3,087,796
APPARATUS FOR MAKING CARBON BLACK
Filed May 31, 1960 3 Sheets-Sheet 2

INVENTORS
BURTON F. LATHAM JR.
THEODORE A. RUBLE
BY

ATTORNEY

April 30, 1963  B. F. LATHAM, JR., ET AL  3,087,796
APPARATUS FOR MAKING CARBON BLACK
Filed May 31, 1960  3 Sheets-Sheet 3

INVENTORS
BURTON F. LATHAM JR.
THEODORE A. RUBLE
BY

ATTORNEY

United States Patent Office 3,087,796
Patented Apr. 30, 1963

---

3,087,796
APPARATUS FOR MAKING CARBON BLACK
Burton F. Latham, Jr., and Theodore A. Ruble, Amarillo, Tex., assignors to Continental Carbon Company, Amarillo, Tex., a corporation of Delaware
Filed May 31, 1960, Ser. No. 32,688
8 Claims. (Cl. 23—259.5)

This invention relates to the production of carbon black by the pyrolysis of normally liquid carbonaceous materials. More specifically, this invention relates to an improvement in an apparatus adapted for economical production of carbon black wherein the manufacturing process inherently involved consists basically of enveloping the periphery of a vaporized or atomized spray of a liquid hydrocarbon with a rapidly moving and turbulent hot sheath of gas whereby the radiant heat of the gas effects dissociation of the hydrocarbon into carbon black particles and byproduct gases. In narrower aspects, the present invention pertains to an improved carbon black reactor of the type described in combination with a carbon black recovery system wherein the sensible heat associated with the reactor effluent is utilized in a novel manner to preheat free oxygen containing gas employed in the pyrolysis reaction phase.

The carbon black manufacturing process inherent in the use of the apparatus of this invention is old in the art. Such a method has enjoyed considerable commercial success and has all but relegated the commercial use of the channel black process for producing carbon black. The replacement of the channel black process with the so-called oil-black process was primarily dictated by economical considerations. While the channel black method had, and as a matter of fact retains certain advantages, it nevertheless represents a comparatively expensive overall manufacturing process because of the continually mounting cost of the carbonaceous raw material to which the process is limited, namely, natural gas and more importantly because of the extremely poor yields of carbon black realized in the process.

The oil-black process on the other hand represents a comparatively efficient process from the standpoint of carbon black yield in relation to the amount of carbonaceous raw material employed. Furthermore, the variety of carbonaceous raw materials that can be used as feedstocks in the process, as for example, hydrocarbon oil distillate fractions, thermal tar residua, shale oil, coal tar, etc. are abundantly available and historically relatively stable in price.

The oil-black methods necessitate the use of rather sophisticated type process equipment in comparison with the equipment used in the channel black method. Consequently, there has been a considerable amount of endeavors expended in the prior art along the lines of developing improved apparatuses for use in the oil-black processes. Much of this prior art activity, however, has been directed toward improving certain design elements and appurtenances and there has been a seeming dearth of progress in overcoming the cumbersome construction features of the prototype oil-black reactors.

Improvements of the latter nature constitute the primary objective of the present invention. This and other objects will be better understood by those skilled in the art upon consideration of the detailed discussion set forth hereinbelow.

In our co-pending applications, Ser. No. 787,210, filed January 16, 1959, and Ser. No. 789,714, filed January 28, 1959, now Patents Nos. 3,033,651 and 2,976,128, respectively, there is disclosed and claimed certain apparatus embodiments adapted for producing carbon black by the oil-black process. The basic concept underlying these embodiments represents a comparatively radical departure from the known art in this field. The principal advantages of the apparatuses set forth in the aforesaid applications are the relative simplicity and overall inexpensiveness of the equipment itself and especially the low operation and maintenance cost involved in the use thereof.

The apparatus of our present invention resembles in certain respects the reactor of the said co-pending applications but is primarily distinguished therefrom in that a component part, more specifically, the reactor section or component wherein the pyrolysis of the hydrocarbon is substantially initiated and essentially consumated, is of improved design. A preliminary insight as to the general nature of the present invention as well as the advantages it manifests over the prior art, including our above referred to contributions, can be simultaneously facilitated by first briefly considering the apparatus and process exemplified in said pending cases.

The apparatus referred to is an all-metal carbon black reactor comprising an inner metallic elongated tubular member concentrically mounted within a similar tube serving as a shell or housing for the assembly. At the downstream end or reaction product egress portion, the ends of the housing and inner tubular member are flush, whereas at the upstream end the housing extends beyond the corresponding end of the inner tube. This arrangement provides an unobstructed cylindrical chamber at the upstream extremity of the assembly upon closing the housing end at that point. Within said chamber there is axially mounted both fuel gas and hydrocarbon injection means. Preferably, the fuel gas is injected radially within the chamber and the spray is directed in a conical pattern into the upstream opening of the inner tube.

In operation, combustion air is introduced into the annular spacing between the inner tube and housing member at the downstream end and is impelled helically therein toward the upstream end of the assembly. The combustion air accordingly enters the cylindrical end chamber in an inwardly spiralling manner and turbulently mixes with gas which produces a flame which envelopes the hydrocarbon spray and forms a flaming annular sheath around the spray progressing through the inner tube.

An important aspect of the apparatus resides in the cooling fins emanating from the outside surface of the inner tube. The air flowing through the annular spacing impinges upon these fins while progressing therethrough in a helical fashion and thereby effects a heat transfer condition which serves two purposes. Firstly, the reactor tube (inner tube) is effectively cooled which is a requirement in light of the fact that the temperatures developed within the reactor tube are extremely high, e.g., greater than 2000° F. Secondly, the combustion air is preheated and as a result optimum flame temperatures are beneficially secured at about the portion where the hydrocarbon spray is initially enveloped with the sheath of flame.

The pyrolysis reaction utilized in preparing oil-blacks is endothermic in nature. In view of this, it would logically seem that the cooling effected within the fin-tube reactor would be in itself a disadvantageous feature from the standpoint of reaction efficiency, quality of product, etc. However, as a practical matter, this is not so. An answer to this seeming contradiction is believed to reside in the special conditions met in conducting the pyrolysis of hydrocarbons. Apparently, the heat present in the greater portion of the reactor confines is heat which had already been utilized to effect substantially complete dissociation of the hydrocarbon and as such merely represents sensible heat in the system.

The fin-tube reactor has a plurality of advantages, some of which have been hereinabove mentioned. However, there is a disadvantage in that the fin-tube portion is rather difficult to fabricate to meet the conditions of temperature experienced in its use as a carbon black reactor and consequently such elements are not readily available. Also, the art of making fin-tubes has not as yet progressed to a degree where such tubes can be considered as representing complete service dependability under the extreme conditions experienced in making carbon black. The definite need for an alternate reactor more dependable under extended service conditions was therefore obviously indicated.

In consideration of the various factors believed to be involved in the successful operation of the fin-tube reactor, one would not expect that a similar apparatus lacking the heat-transfer capabilities of the fin-tube reactor could constitute a suitable carbon black producing apparatus. Therefore, it was most surprising to find that an apparatus comparable in the main to the construction features of our prototype apparatus but utilizing a refractory lined standard steel tube instead of a fin-tube represented an excellent version of an apparatus of this type. Heat transfer conditions in the apparatus of this invention were unexpectedly found to be sufficiently favorable so as to permit the efficient production of high quality HAF and ISAF carbon blacks. If higher preheat temperatures are desired for the production of special types of carbon black, it will be shown how the present apparatus can be modified in order to achieve same.

The present invention, then, comprises the novel features generally outlined hereinabove which will be fully described with reference to certain illustrative embodiments shown in the accompanying drawings, in which.

Figure 1:
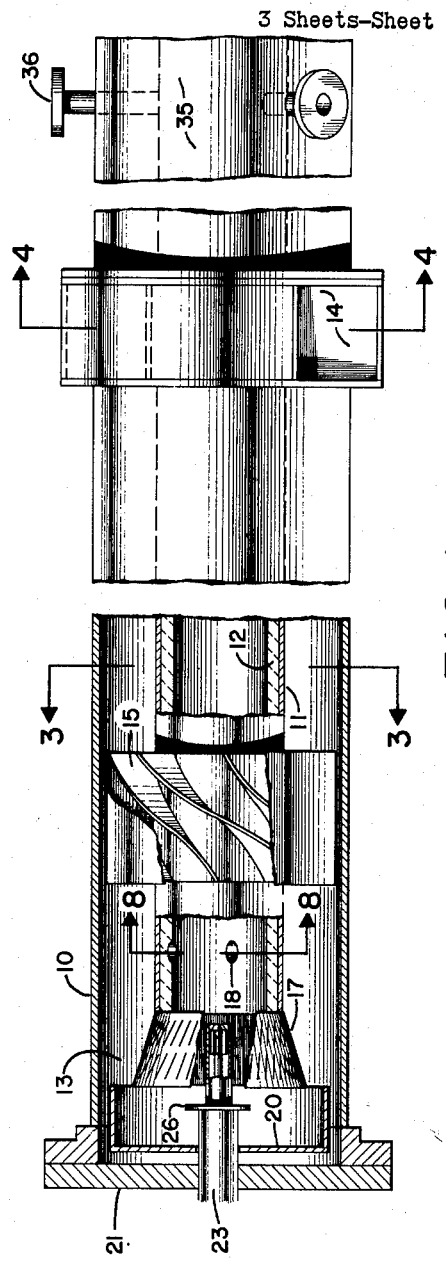
FIG. 1 is a longitudinal side view, partly in section, illustrating one form of an apparatus embodying the teachings of the present invention.

Referring to the drawings and particularly to FIG. 1 thereof, the numeral 10 designates an elongate metallic housing or shell which comprises the outer jacket of the apparatus of the present invention in which there is concentrically disposed an elongate metallic tube 11 of lesser diameter than that of said housing, said elongate tube being provided with an inner lining of refractory 12. The refractory lining is preferably constructed of a material having a relatively high heat transfer coefficient. Suitable refractory liners can be either pre-cast sleeves, fabricated from silica carbide for example and adapted to fit snugly within the elongate tube 11, or can be molded in place employing conventional castable refractory compositions.

Additionally, as a specific example, the outer housing or shell 10 can take the form of standard 18-inch (inside diameter) steel pipe with the inner elongate tube 11 being from about 10 to 14 inches in inside diameter and also of standard steel composition. The length of the housing can acceptably vary between about 10 and 15 feet and the length of the inner tube can suitably be about 2 to 3 feet less than the length selected for the shell member. The refractory lining 12 is desirably of the minimum thickness capable of protecting the tube 11 for an extended period of time. A 2-inch thick liner of a castable kaolin-based refractory within a 14-inch diameter tube has been successfully employed in an apparatus of the type presently described.

Referring to the left-hand end of FIG. 1, the adjacent end of the inner elongate tube 11 terminates short of the corresponding end of the outer shell 10 thereby providing a cylindrical chamber 13 substantially unobstructed save for certain appurtenances disposed therein, the function of which will be described hereinafter.

In FIG. 1, free oxygen containing gas, as for example atmospheric air, enters tangential air inlet 14 at the right-hand end of the outer shell 10 to be circulated in an annular spacing between said shell and the inner tube 11 for the purposes stated earlier herein. The tangential air inlets 14 can acceptably take the form of a rectangular slot as shown or alternatively can be circular in design. While two tangential air inlets are shown in the instant figure, the disposition of which can be noted by reference to FIG. 4, more than two inlets can be provided and in some instances one of such inlets will suffice.

Disposed towards the left-hand end or downstream end opening of the inner tube 11 are various elements which, individually or collectively can be utilized to impart an inwardly spiralling rotation to the input air progressing from the tangential air inlet 14 through the annular spacing and ultimately into said unobstructed chamber 13. More particularly, said elements can take the form of a section of helically disposed air-turning vanes 15, or an appropriately louvered metallic frusto-cone 17 with its smaller end suitably connected to the adjacent end of the inner tube 11, as by welding, bolting, etc. More specific details as to the construction of the metallic frusto-cone 17, trivially designated grit-eliminator, will be given later. As indicated, these elements can be used singularly or in combination as shown in FIG. 1. For greatest efficiency of purpose, however, it is desirable to employ the air-turning vanes 15 in conjunction with the frusto-cone 17. Advantageously, the section of air-turning vanes is mounted within the annular spacing at a location somewhat removed longitudinally from the upstream end opening of the inner tube 11. In this manner, any tendency for the air to enter the chamber 13 or impinge upon the grit-eliminator in a channeling fashion is substantially obviated. Any number of individual vanes can be used. The pitch thereof can also be varied in order to obtain the precise degree or form of spiralling action desired. The vanes can be affixed in a number of suitable ways such as for example by welding to the inner tube, mounting on a circular band which in turn is bolted to the inner tube, etc.

Figure 8:
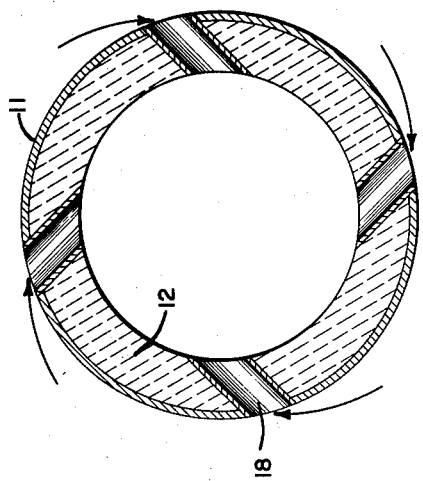
FIG. 8 is a transverse view taken along line 8—8 in FIG. 1.

Also shown in FIG. 1 are a plurality of ports or inlets 18 providing open communication between the annular spacing and the inner tube. These ports are preferably proximately adjacent the downstream opening of the inner tube. As shown in detail in FIG. 8 said ports are positioned tangentially with respect to the inner cylindrical wall of inner tube 11. A provision of this type serves to facilitate the effective formation of the annular sheath of gas around the hydrocarbon within the inner tube and additionally aids in preventing grit development in said tube.

The grit-eliminator 17 positioned and mounted within the cylindrical chamber 13 as described hereinabove can be fabricated from any suitable sheet metal, such as for example, 22 gauge, No. 309 stainless steel. The main body portion of the grit-eliminator is provided with a plurality of rows of louvers 19. In FIG. 1, the louvers 19 are illustratively shown as being in a double row and extending obliquely in a scooplike position with respect to the helical flow of air impinging thereon. With regard to size, the louvers can acceptably be approximately 2-inch long by ¼ to ½-inch wide for an installation of the size apparatus generally described herein.

Figure 5:
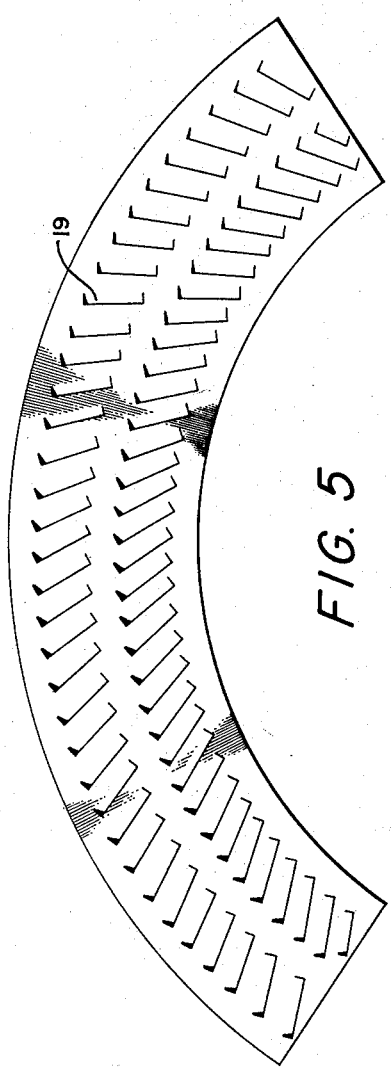
FIG. 5 is a pattern layout for an element of the apparatus of FIG. 1.
Figure 3:
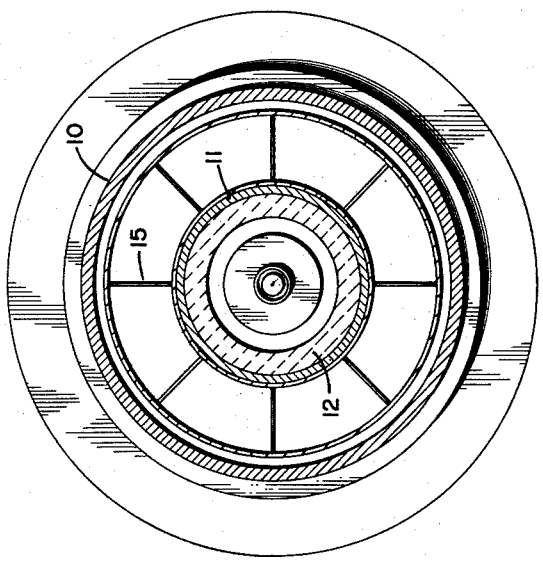
FIG. 3 is a transverse view taken along line 3—3 in FIG. 1.

In FIG. 5 of the drawings, there is shown a pattern layout of the grit-eliminator 17.

Each one of the louvers 19 may be made by cutting along the solid lines shown in the pattern layout and bending the cut sections inwardly to provide a louvered area to be employed in operation with the direction of helical flow shown in FIG. 1 upon upwardly rolling the sheet into the form of a frustrum.

Within the cylindrical chamber 13, and in axial alignment therewith, is a heat shield 20 which can acceptably be fabricated from 10 gauge, No. 309 stainless steel. Said heat shield can suitably resemble a shallow cylindrical pan having a diameter intermediate between the diameters of the inner tube 11 and the outer shell 10 and preferably approximately corresponding to the diameter of the latter as shown in drawing FIG. 1. The central apertured base of the heat shield is suitably supported by the adjacent cover member 21 enclosing the upstream end of the metallic housing.

Figure 2:
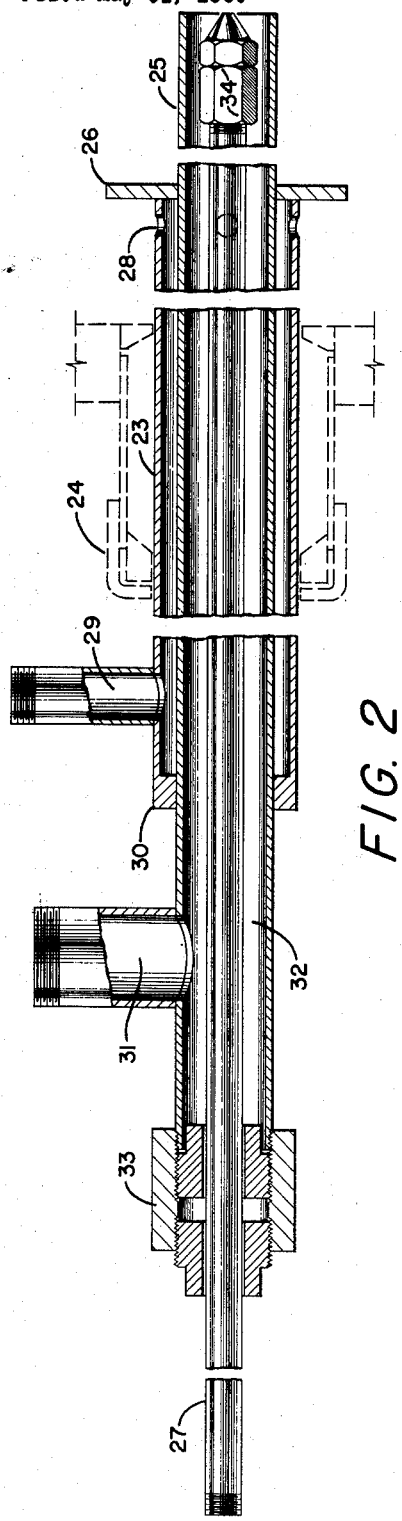
FIG. 2 is a longitudinal side view, minorly in section, illustrating in greater detail the burner and hydrocarbon injection assembly shown in the apparatus of FIG. 1.

With reference to FIG. 2, the burner and hydrocarbon injection assembly generally depicted in FIG. 1 is shown in detail as comprising a tube 23 extending through the cover member 21 substantially axially and rigidly attached thereto by means of a packing gland 24 shown schematically by the dotted line portion of the FIG. 2. A tube 25 is disposed concentrically within the tube 23 and extends within the cylindrical chamber preferably beyond the extremity of the tube 23. A vertically disposed disc or circular plate 26 serves as a closure member for the annular spacing formed between tubes 23 and 25 at the extremity of said spacing disposed within the chamber 13. The primary purpose of disc 26 is to prevent blowout of the flame under operating conditions. The disc 26 has a diameter which is substantially greater than the outside diameter of the tube 23 and is provided with a center aperture having a diameter substantially that of the outside diameter of tube 25. The disc is rigidly attached to the respective tubes by means of welding.

Concentrically mounted by means of spacers (not shown) within tube 25 is a liquid hydrocarbon supply pipe 27 which is terminated with a spray nozzle at a point approximately flush with the corresponding extremity of tube 25. Immediately behind disc 26 are provided a plurality of radially oriented apertures 28 through tube 23 communicating with annular spacing formed between said tube and tube 25. The other (and externally projecting) extremity of tube 23 is provided with an annular closure member 30. Combustion gas is supplied to the apertures 28 through the gas inlet connection 29. Rearwardly of the annular closure member 30 is provided an air inlet connection 31 through which is introduced air into the annular air chamber 32 formed by the inner surface of tube 25 and outer surface of the oil supply pipe 27; said annular chamber 32 being provided with the closure member 33. The axial air flowing within the annular chamber 32 forms a concentrated stream on the oil spray emanating from the spray head 34 and thereby aids in directing the spray down the center of inner tube 11. However, the primary function of said annular air flow is to prevent coke from forming on the nozzle tip to the degree whereby its spraying capacity is impaired. The spray head together with the annular air introduction means described can be positioned at any point along the axis of the chamber 13 or can even be positioned within the inner tube 11 itself.

Although not forming any part of the instant invention there is shown in FIG. 1 the initial part of a recovery system in the form of a standard quench section. As illustrated in the drawings, this section consists of a housing member 35 of substantially the same diameter as the outer shell 10 and rigidly coupled to the latter in axial alignment therewith. The said attaching or coupling means can be used at the same time to form a closure member for the annular spacing between inner tube 11 and the outer shell housing 10 at the downstream extremity of these tubular units. The inner diameter of the quench section is customarily of the same diameter as the inner diameter of the refractory lining tube 11. Generally a thick lining of a refractory is used within the quench housing member in order to reduce the diameter thereof to approximately that of the inner diameter of adjacent reactor tube. The quench section is provided with the customary radial spray ports 36 through which there extends a water pipe terminating adjacent to the center line of the inner tube 11 and carrying a spray head from which the necessary quenching spray is delivered in order to effect cooling of the effluent emanating from the reaction zone within the inner tube 11.

It was mentioned previously that in the operation of the apparatus in accordance with this invention there may arise instances where it is desirable to obtain combustion air preheat temperatures in excess of the maximum attainable in accordance with the embodiment shown in FIG. 1.

Figure 6:
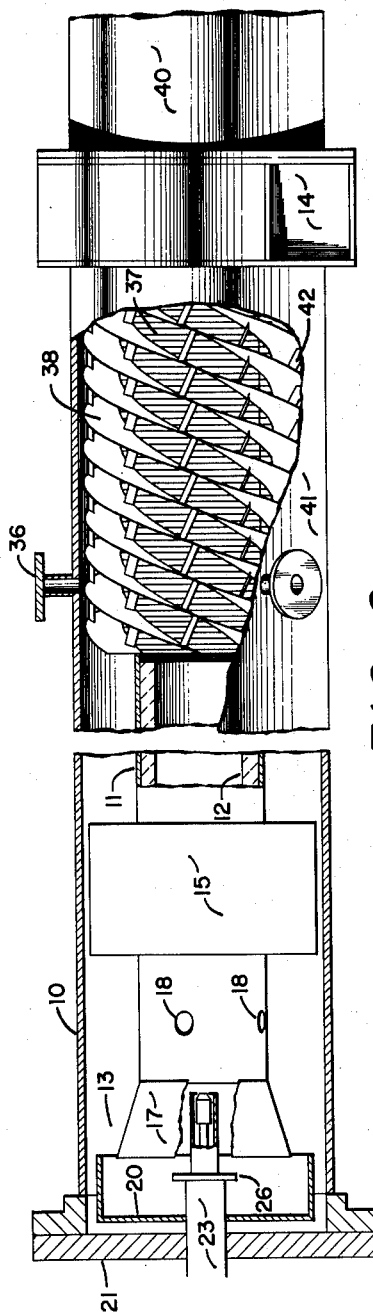
FIG. 6 is a longitudinal side view, partly in section, of an embodiment in accordance with this invention, said view illustrating in detail the initial portion of a recovery system advantageously adapted for use in combination with the carbon black reactor of FIG. 1.

FIG. 6 illustrates a method or more strictly an apparatus modification which will result in such higher combustion air preheat temperatures. This figure at the left-hand side depicts an apparatus assembly identical with that of the reactor section shown in FIG. 1. The right-hand part of the figure illustrates the novel quench section contemplated for this embodiment which is formed by a downstream extension of the inner tube 11 and outer shell 10, that is, employing lengths of these respective tubular members greater than that required for the reactor section. As can be noted from the figure, fins are provided on the inner tube 11 starting approximately adjacent to the point where the refractory lining of the reactor section terminates. In so far that the fin-tube section of the apparatus is a continuation of the inner or reactor tube it is desirable to use a heat resistant steel such as stainless steel for this tubular member. Because of the refractory lining existing in the reaction zone, one can use standard steel for this purpose. However, in spite of the quenching or sudden cooling of the effluent gases emerging from the reaction zone, the temperatures encountered in the quench section are sufficiently high so as to have an adverse effect on this tube should standard steel be used. Accordingly, the most expeditious way of constructing the present embodiment is to use a continuous stainless or equivalent heat-resistant steel tube for the purpose of a reaction zone and quench section.

The cooling fins 37 emanating from the inner tube 11 in the quench section 41 can be approximately 1-inch in width and spaced aproximately ¼-inch apart. The fins 37 are shown as concentric projections parallelly disposed along the horizontal axis of the tube 11 of the quench section. However, the fins may be disposed helically if so desired. Also, the fins can be in the form of parallelly disposed longitudinal projections. An axial fin arrangement of this type is shown in our co-pending case, Ser. No. 787,210, now Patent No. 3,033,651. The cooling fins 37 are attached to the tube 11 by any suitable method which results in efficient heat conductivity between the tube member and the attached fin. Thus, the fins may be welded to the tube or recessed into channels cut into the tube and appropriately soldered therein.

In order to achieve efficient contact of the combustion air with the aforedescribed fins, it is desirable to provide in the annular spacing within the quench section 41, that is, in the annular spacing formed by the extension of reactor tube 11 and the housing shell 10, helically disposed air directing channels. In the illustrative embodiment, the helically disposed vanes 38 accomplish said channeling. To further provide for the more efficient heat transfer conditions between the air and fins the members 42, consisting of narrow plates, are interposed between the adjacent vanes 38 and so positioned as to facilitate the incidence of the helically progressing air onto the fin members. Thus a zig-zag air flow pattern is beneficially accomplished within the helical channels.

The combustion air after passing the length of helicoid passageway within the annular space surrounding the quench section enters into the substantially unobstructed annular spacing formed between the outer shell 10 and the refractory lined reaction section of the inner tube 11. The helical flow imparted to the combustion air within the helicoid passageway is ordinarily sufficient to maintain this type of flow throughout the upstream or remainder portion of the annular spacing and thence into the chamber 13. However, it is usually desirable to provide a section of air-turning vanes 15 as illustrated in connection with the discussion of the embodiment exemplified in FIG. 1 in order to orientate the air direction to the precise degree desired. Obviously the turning vanes 15 are to be disposed in the same general direction chosen for the vanes 38 disposed within the quench section.

Figure 4:
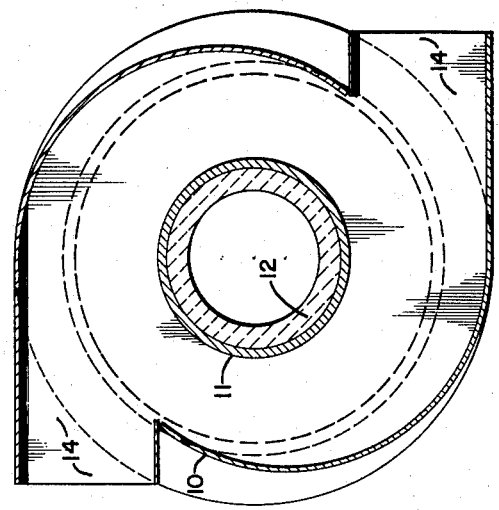
FIG. 4 is a transverse view taken along line 4—4 in FIG. 1.

In the instant embodiment, the combustion air is initially introduced into the system through a tangential air inlet 14 having a construction similar to that of the air inlet 14 shown in FIG. 1 and more particularly illustrated in FIG. 4. The tangential air input(s) 14 is disposed at the downstream extremity of the shell portion 10 constituting the housing for the quench section. The ports 36 shown disposed towards the upstream portion of the quench section are adapted for the insertion of water pipes. In operation, the water pipes are inserted in said ports and the outlet portion thereof provided with a quenching spray which spray is directed towards the center line of the reaction zone in the same manner as described previously herein.

The carbon black produced in the reaction zone after proceeding through the quench section is removed from the effluent gases by means of the usual collecting devices which are well known in the art. The member 40 represents a communication to said type of recovery systems.

Figure 7:
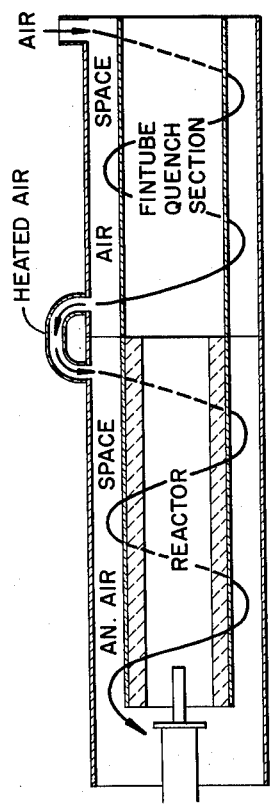
FIG. 7 illustrates diagrammatically a further modification of the embodiment shown in FIG. 6.

A variation of the embodiment described directly hereinabove is illustrated schematically in FIG. 7. The essential difference between this embodiment and that exemplified in FIG. 6 is that the quench section and the reactor section do not share common tubular members for their outer shells and inner tubes. However, it is contemplated that the quench section be a fin-tube section such as described hereinabove and that the reaction section correspond to that described in connection with FIG. 1. The air preheated in the quench section is conducted into the annular spacing within the reaction section by any suitable conduit method. Utilization of the concept of this embodiment permits one to employ a standard steel tube for the inner tube in the reaction section rather than using stainless steel for this section as would be otherwise preferred if the construction were that corresponding to the embodiment of FIG. 6.

While we have shown and described certain illustrative embodiments of the invention, it will be readily understood that we do not wish to be limited thereto, since obviously various modifications can be made by those skilled in the art without departing from the spirit of the present invention.

We claim:
1. An apparatus for producing carbon black which comprises:
  (a) an elongate tubular metallic housing having an upstream end and a downstream end, and a cover member closing said upstream end;
  (b) an elongate tubular, metallic reactor of lesser diameter than said housing supported substantially concentrically therein thereby providing an annular spacing therebetween, said reactor having substantially unrestricted upstream and downstream end openings and an essentially smooth metallic peripheral surface free from obstructions except for an air deflection means hereinafter defined, said reactor upstream end opening disposed in longitudinal spaced relationship from said covered upstream housing end thereby providing an unobstructed cylindrical chamber therebetween having a length substantially less than that of said reactor;
  (c) heat conducting refractory means lining said reactor, said refractory means being of minimum thickness to protect the reactor and to provide maximum heat transfer through said reactor to said annular spacing;
  (d) air input means disposed toward the downstream end of said housing and communicating with said annular spacing, said input means adapted to impel air through said annular spacing in the general direction of said chamber;
  (e) air deflection means of substantially less length than the length of said reactor disposed within said annular spacing in the vicinity of said reactor upstream opening, said air deflection means adapted to impart a generally inwardly spiraling motion to the air flowing from said annular spacing into said chamber but not adapted to provide any substantial degree of heat transfer to said air;
  (f) a gas burner substantially concentrically disposed within said chamber; and
  (g) a hydrocarbon inlet means positioned in substantial axial alignment with said burner whereby the hydrocarbon is introduced into the vortex of a flame produced by said burner.

2. An apparatus in accordance with claim 1 wherein said burner comprises an inner air supply pipe concentrically disposed within an outer pipe sufficiently larger than said inner pipe so as to provide an annular fuel gas supply passage therebetween; a vertically disposed, centrally apertured circular plate fixedly mounted about said inner pipe and attached to the extremity of said outer pipe thereby terminating said annular fuel gas supply passage, said plate having a diameter substantially greater than that of said outer pipe and substantially less than that of said reactor, and said outer pipe having a plurality of gas orifices directed generally radially around its periphery adjacent to said circular plate; and wherein said hydrocarbon inlet means comprises a hydrocarbon supply pipe having an outside diameter less than the inner diameter of the hereinbefore described inner air supply pipe and concentrically mounted therein.

3. An apparatus in accordance with claim 2 wherein said air deflection means comprises a plurality of parallelly spaced helicoid strips each having a width corresponding to about that of the cross-sectional width of said annular spacing disposed perpendicularly about the peripheral surface of said reactor.

4. An apparatus in accordance with claim 3 containing a flared extension communicating with said reactor at the upstream opening thereof and in axial alignment with said burner, said extension being provided with a series of louvers for receiving air from said annular spacing and directing same toward the interior of said extension.

5. An apparatus for producing carbon black which comprises:
  (a) an elongate tubular metallic housing having an upstream end and a downstream end, and a cover member closing said upstream end;
  (b) an elongate tubular reactor having substantially unrestricted upstream and downstream end openings and of lesser diameter and length than that of said housing supported substantially concentrically therein with the respective downstream ends in substantial flush alignment thereby providing an annular spacing therebetween and an unobstructed cylindrical chamber between said reactor upstream opening and said covered upstream housing end, said chamber having a length substantially less than that of said reactor;

(c) a series of fins encompassing the outer surface of said reactor abutting the downstream end thereof;

(d) heat conducting refractory means lining said reactor, commencing at its upstream end opening and extending to approximately the upstream extremity of the lateral extension of said fins, said refractory means being of minimum thickness to protect the reactor and to provide maximum heat transfer through said reactor to said annular spacing;

(e) air supply means positioned in a wall of said housing at the downstream end thereof and communicating with said annular spacing;

(f) air deflection means of substantially less length than the length of that portion of said reactor that is lined disposed within said annular spacing in the vicinity of said reactor upstream opening, said air deflection means adapted to impart a generally inwardly spiraling motion to the air flowing from said annular spacing into said chamber but not adapted to provide any substantial degree of heat transfer to said air;

(g) a gas burner substantialy concentrically disposed within said chamber; and (h) a hydrocarbon inlet means positioned in substantial axial alignment wtih said burner whereby the hydrocarbon is introduced into the vortex of a flame produced by said burner.

6. An apparatus for producing carbon black which comprises:

(a) an elongate tubular metallic housing having an upstream end and a downstream end, and a cover member closing said upstream end;

(b) an elongate tubular, metallic reactor of lesser diameter than said housing supported substantially concentrically therein thereby providing an annular spacing therebetween, said reactor having substantially unrestricted upstream and downstream end openings and an essentially smooth metallic peripheral surface free from obstructions except for an air deflection means hereinafter defined, said reactor upstream end opening disposed in longitudinal spaced relationship from said covered upstream housing end thereby providing an unobstructed cylindrical chamber therebetween having a length substantially less than that of said reactor;

(c) heat conducting refractory means lining said reactor, said refractory means being of minimum thickness to protect the reactor and to provide maximum heat transfer through said reactor to said annular spacing;

(d) air input means disposed toward the downstream end of said housing and communicating with said annular spacing, said input means adapted to impel air through said annular spacing in the general direction of said chamber;

(e) air deflection means of substantially less length than the length of said reactor disposed within said annular spacing in the vicinity of said reactor upstream opening, said air deflection means comprising a plurality of parallelly spaced helicoid strips each having a width corresponding about to that of the cross-sectional width of said annular spacing disposed perpendicularly about the peripheral surface of said reactor and adapted to impart a generally inwardly spiraling motion to the air flowing from said annular spacing to said chamber but not adapted to provide any substantial degree of heat transfer to said air;

(f) a plurality of ports disposed within the wall of said reactor and about its circumference at a point intermediate between the upstream opening thereof and said air deflection means, said ports providing open communication between said annular spacing and the interior of the reactor and positioned so as to direct air passing therethrough in a direction substantially tangential to the inner surface of the reactor;

(g) a gas burner substantially concentrically disposed within said chamber; and (h) a hydrocarbon inlet means positioned in substantial axial alignment with said burner whereby the hydrocarbon is introduced into the vortex of a flame produced by said burner.

7. An apparatus for producing carbon black which comprises:

(a) an elongate tubular metallic housing having an upstream end and a downstream end, and a cover member closing said upstream end;

(b) an elongate tubular, metallic reactor of lesser diameter than said housing supported substantially concentrically therein thereby providing an annular spacing therebetween, said reactor having substantially unrestricted upstream and downstream end openings and an essentially smooth metallic peripheral surface free from obstructions, said reactor upstream end opening disposed in longitudinal spaced relationship from said covered upstream housing end thereby providing an unobstructed cylindrical chamber therebetween having a length substantially less than that of said reactor;

(c) heat conducting refractory means lining said reactor, said refractory means being of minimum thickness to protect the reactor and to provide maximum heat transfer through said reactor to said annular spacing;

(d) tangential air input means disposed towards the downstream end of said housing and communicating with said annular spacing, said tangential input means adapted to impel air helically through said annular spacing in the general direction of said chamber;

(e) a gas burner substantially concentrically disposed within said chamber;

(f) a hydrocarbon inlet means positioned in substantially axial alignment with said burner whereby the hydrocarbon is introduced into the vortex of a flame produced by said burner; and (g) a flared extension communicating with said reactor at the upstream opening thereof and in axial alignment with said burner, said extension being provided with a series of louvers for receiving air from said annular spacing and directing same toward the interior of said extension.

8. An apparatus in accordance with claim 7 wherein said burner comprises an inner air supply pipe concentrically disposed within an outer pipe sufficiently larger than said inner pipe so as to provide an annular fuel gas supply passage therebetween; a vertically disposed, centrally apertured circular plate fixedly mounted about said inner pipe and attached to the extremity of said outer pipe thereby terminating said annular fuel gas supply passage, said plate having a diameter substantially greater than that of said outer pipe and substantially less than that of said reactor, and said outer pipe having a plurality of gas orifices directed generally radially around its periphery adjacent to said circular plate; and wherein said hydrocarbon inlet means comprises a hydrocarbon supply pipe having an outside diameter less than the inner diameter of the hereinbefore described inner air supply pipe and concentrically mounted therein.

References Cited in the file of this patent

UNITED STATES PATENTS

| 2,498,444 | Orr | Feb. 21, 1950 |
| 2,785,054 | Bethea et al. | Mar. 12, 1957 |
| 2,852,345 | Rushford | Sept. 16, 1958 |
| 2,924,512 | Webster et al. | Feb. 9, 1960 |
| 2,976,128 | Latham et al. | Mar. 21, 1961 |

FOREIGN PATENTS

| 547,324 | Canada | Oct. 8, 1957 |